US011027950B2

United States Patent
Bauer

(10) Patent No.: US 11,027,950 B2
(45) Date of Patent: Jun. 8, 2021

(54) SYSTEM HAVING A SECONDARY CURRENT GENERATING ASSEMBLY FOR THE SECONDARY CONVERSION INTO ELECTRICITY OF EXHAUST GAS HEAT FROM A PRIMARY CURRENT GENERATING ASSEMBLY

(71) Applicant: Konecranes Global Corporation, Hyvinkää (FI)

(72) Inventor: Reinhard Bauer, Remlingen (DE)

(73) Assignee: Konecranes Global Corporation, Hyvinkää (FI)

( * ) Notice: Subject to any disclaimer, the term of this patent is extended or adjusted under 35 U.S.C. 154(b) by 124 days.

(21) Appl. No.: 16/346,007

(22) PCT Filed: Oct. 25, 2017

(86) PCT No.: PCT/EP2017/077335
§ 371 (c)(1),
(2) Date: Apr. 29, 2019

(87) PCT Pub. No.: WO2018/077963
PCT Pub. Date: May 3, 2018

(65) Prior Publication Data
US 2020/0056564 A1 Feb. 20, 2020

(30) Foreign Application Priority Data

Oct. 31, 2016 (DE) .......................... 102016120764.0

(51) Int. Cl.
*B66C 19/00* (2006.01)
*B60L 50/15* (2019.01)
(Continued)

(52) U.S. Cl.
CPC ............ *B66C 19/007* (2013.01); *B60L 50/15* (2019.02); *B66C 13/22* (2013.01); *F01N 5/04* (2013.01);
(Continued)

(58) Field of Classification Search
CPC . B66C 19/00–007; B66C 13/52; B66C 13/22; B60L 50/15; B60L 50/50;
(Continued)

(56) References Cited

U.S. PATENT DOCUMENTS

2010/0146968 A1 6/2010 Simpson et al.
2011/0209473 A1 9/2011 Fritz et al.
(Continued)

FOREIGN PATENT DOCUMENTS

CH 705180 12/2012
CN 202064388 12/2011
(Continued)

OTHER PUBLICATIONS

International Preliminary Examination Report on Patentability in English from corresponding Patent Cooperation Treat (PCT) Application No. PCT/EP2017/077335, dated Feb. 11, 2019.
(Continued)

*Primary Examiner* — Mark A Laurenzi
*Assistant Examiner* — Mickey H France
(74) *Attorney, Agent, or Firm* — Gardner Linn

(57) ABSTRACT

A system having a primary current generating assembly includes a primary thermal engine and a secondary current generating assembly, in particular an electric turbo compound installation, for the secondary conversion into electricity of exhaust gas heat from the primary current generating assembly. The secondary current generating assembly includes an exhaust gas turbine arranged in an exhaust gas stream of the primary thermal engine, and the exhaust gas
(Continued)

turbine drives an electric secondary generator. In order to improve efficiency, and in particular to reduce fuel consumption, it is proposed that an exhaust gas cooler followed by a compressor are arranged in the exhaust gas stream downstream of the exhaust gas turbine, the compressor being driven by an electric motor and the rotational speeds of the compressor and the exhaust gas turbine are controlled by a process control system. The disclosed invention also relates to a vehicle equipped therewith.

15 Claims, 2 Drawing Sheets

(51) Int. Cl.
　　*B66C 13/22*　　(2006.01)
　　*F01N 5/04*　　(2006.01)
　　*F02C 6/00*　　(2006.01)
　　*F02G 5/02*　　(2006.01)
　　*B60L 50/50*　　(2019.01)
(52) U.S. Cl.
　　CPC ............... *F02C 6/006* (2013.01); *F02G 5/02* (2013.01); *B60L 50/50* (2019.02); *B60L 2200/42* (2013.01); *F17C 2221/033* (2013.01); *F17C 2223/0161* (2013.01)
(58) Field of Classification Search
　　CPC ...... B60L 50/60; B60L 50/62; B60L 2200/42; F01N 5/04; F02C 6/006; F02G 5/02
　　USPC .................................................... 60/614, 280
　　See application file for complete search history.

(56) References Cited

U.S. PATENT DOCUMENTS

| | | | | |
|---|---|---|---|---|
| 2014/0150432 A1* | 6/2014 | Matsumura | ............... | F01K 9/00 60/676 |
| 2015/0044061 A1* | 2/2015 | Hutten | .................. | F04D 29/668 417/42 |

FOREIGN PATENT DOCUMENTS

| | | | | |
|---|---|---|---|---|
| CN | 202064388 U | * | 12/2011 | |
| CN | 104160613 | | 11/2014 | |
| CN | 105317553 | | 2/2016 | |
| DE | 69738474 | | 1/2009 | |
| DE | 102008025426 | | 12/2009 | |
| DE | 102012203426 | | 9/2013 | |
| DE | 202014000158 U1 | * | 4/2015 | ............... F01K 5/02 |
| DE | 102015215518 | | 2/2017 | |
| EP | 1925492 | | 5/2008 | |
| EP | 2759509 | | 4/2014 | |
| EP | 2980383 | | 2/2016 | |
| JP | 2009215906 | | 9/2009 | |

OTHER PUBLICATIONS

International Search Report and Written Opinion of the International Searching Authority from corresponding Patent Cooperation Treaty (PCT) Application No. PCT/EP2017/077335, dated Jan. 24, 2018.

International Preliminary Examination Report from corresponding Patent Cooperation Treaty (PCT) Application No. PCT/EP2017/077335, dated Feb. 11, 2019.

\* cited by examiner

SYSTEM HAVING A SECONDARY CURRENT GENERATING ASSEMBLY FOR THE SECONDARY CONVERSION INTO ELECTRICITY OF EXHAUST GAS HEAT FROM A PRIMARY CURRENT GENERATING ASSEMBLY

CROSS REFERENCE TO RELATED APPLICATIONS

The present application is a § 371 national stage of International Application PCT/EP2017/077335, filed Oct. 25, 2017, which claims priority benefit of German Pat. Application DE 10 2016 120 764.0, filed Oct. 31, 2016.

FIELD OF THE INVENTION

The invention relates to a system with a primary current generating assembly, in particular for a vehicle for handling freight containers.

European patent EP 2 759 509 B1 discloses a gantry lift stacker having a hybrid drive which, in addition to an electric generator, has an internal combustion engine for gas or diesel. A so-called electric turbo compound (ETC) installation is connected downstream of the hybrid drive to provide secondary conversion into electricity of exhaust gas energy of the internal combustion engine. The ETC installation contains, in addition to an exhaust gas turbine for generation of mechanical energy from the exhaust gas energy, a generator for generating electrical energy, which generator is mechanically coupled to the exhaust gas stream in order to convert the rotational energy into electrical energy. The exhaust gas turbine is connected to the internal combustion engine via an exhaust gas line, whereby undesired repercussions for the hybrid drive, in particular for the internal combustion engine and the exhaust gas system thereof, can occur.

Furthermore, European patent application EP 1 925 492 A2 discloses a gantry lift stacker with a low-emission and low-maintenance turbine drive. A commercially available microturbine, as previously used in small stationary block heat and power plants with force-heat coupling, is used as the primary current generating assembly in the gantry lift stacker with a hybrid drive. The electrical efficiency thereof is, at less than 30%, lower than that of a primary current generating assembly using a diesel engine and therefore its fuel consumption is also higher. An improvement in the electrical efficiency can be achieved by a downstream secondary exhaust gas turbine or ETC installation which provides secondary conversion of the exhaust gas energy into electricity. However, undesired performance-reducing repercussions for the primary microturbine can occur by reason of the exhaust gas counter-pressure and so hardly any improvements in efficiency ultimately arise.

The German laid-open document DE 10 2008 025 426 A1 discloses a thermal engine with a turbine and compressor for generation of mechanical energy from residual heat of hot exhaust gases. The described thermal engine has a cooler downstream of the turbine, which cooler produces a pressure difference owing to the cooling of the hot exhaust gas. The turbine is driven by this pressure difference. In turn, the turbine drives a compressor required to maintain the pressure difference, which compressor is mechanically connected to the turbine via a shaft. The power output of the turbine is greater than the power required by the compressor. A power excess is thereby generated by the turbine and constitutes a gain in mechanical energy. The generation of electrical energy from this mechanical energy is not provided.

Japanese laid-open document JP 2009 215 906 A relates to a device for the recovery of exhaust gas heat, which is designed to be light and space-saving such that it can also be installed in automobiles. Exhaust gases of an engine are fed to a turbine and expanded therein to a pressure below atmospheric pressure and then fed to a heat exchanger to be cooled. The cooled gas, which is at negative pressure, is brought to atmospheric pressure via a compressor and energy is thereby gained. The exhaust gas turbine, generator and compressor are located on a common shaft.

For automobiles and locomotives US 2010/0146968 A1 discloses a system having a primary current generating assembly and having a secondary current generating assembly for secondary conversion into electricity of exhaust gas heat of the primary current generating assembly. In this case, an exhaust gas cooler is disposed in the exhaust gas stream behind the exhaust gas turbine, and a compressor is disposed behind the cooler. Similar systems are also known from US 2011/0209473 A1, DE 697 38 474 T2 and DE 10 2015 215 518 A1.

CH 705 180 A1 discloses a method for increasing the efficiency of a drive and a device for increasing the efficiency of block heat and power plants.

SUMMARY OF THE INVENTION

The present invention provides a vehicle for handling freight containers, the vehicle having a system with a primary current generating assembly, comprising a primary thermal engine, and with a secondary current generating assembly, in particular an electric turbo compound installation, for secondary conversion into electricity of exhaust gas heat of the primary current generating assembly, in such a way that the efficiency thereof is improved, in particular the fuel consumption thereof is further reduced. This is associated with an improvement in emission levels.

In accordance with one form of the present invention, in a vehicle for handling freight containers having a system having a primary current generating assembly, comprising a primary thermal engine, and having a secondary current generating assembly, in particular an electric turbo compound installation, for secondary conversion into electricity of exhaust gas heat of the primary current generating assembly, wherein the secondary current generating assembly comprises an exhaust gas turbine, disposed in an exhaust gas stream of the primary thermal engine, and the exhaust gas turbine drives a secondary electric generator, a reduction in the fuel consumption is achieved in that, in the exhaust gas stream, an exhaust gas cooler followed by a compressor is disposed behind the exhaust gas turbine, the compressor is driven by an electric motor and the rotational speeds for the compressor and exhaust gas turbine are controlled by a process regulating system, wherein a secondary inverter is allocated to the secondary generator, a frequency converter is allocated to the electric motor of the compressor and the secondary inverter and the frequency converter are communicatively connected via a field bus to an electronic central controller, wherein the electronic central controller permits control of the energy flows of the primary current generating assembly and of the secondary current generating assembly, and the primary current generating assembly and the secondary current generating assembly supply at least one travel drive and at least one lifting drive with energy. The exhaust gas heat of the primary current generating assembly is not needlessly lost. The exhaust gas heat is used to gain secondary energy. The overall efficiency of the system is increased. The fuel consumption and therefore the exhaust gas output of the gantry lift stacker are reduced. Such a system can be operated in a particularly environmentally friendly manner. The secondary current generating assembly can always be operated at the optimal working point with the best possible energy yield from the exhaust gas heat and can be automatically adapted to the changing operating conditions of the thermal engine. Previously known ETC installations can also often be only insufficiently regulated and adapted to the changing operating conditions of the primary thermal engine and the exhaust gas system thereof, such as e.g. an exhaust turbocharger, exhaust gas post-treatment system (SCR), exhaust gas recovery, soot particle filter etc. Also in an advantageous manner it is also generally achieved that the secondary current generating assembly has no unfavourable repercussions for the exhaust gas system or the performance of the primary thermal engine.

In one aspect, the rotational speeds for the compressor and exhaust gas turbine are controlled by the process regulating system in such a way that ambient pressure prevails in the exhaust gas stream at the input of the exhaust gas turbine. For example, the secondary current generating assembly does not react upon the primary thermal engine by counter-pressure. The previously known ETC installations mostly have the disadvantage that the pressure difference which builds up via the downstream turbine generates a counter-pressure on the exhaust gas system of the primary thermal engine and therefore has a performance-reducing effect.

Optionally, the rotational speeds for the compressor and exhaust gas turbine are controlled by the process regulating system in such a way that negative pressure prevails in the exhaust gas stream at the output of the exhaust gas turbine. In this way the performance of the primary thermal engine is not reduced by the downstream secondary current generating assembly. The exhaust gas post-treatment and exhaust gas cleaning of the primary thermal engine are also not influenced by the secondary current generating assembly. Thus the secondary current generating assembly can be mounted retrospectively on the already operational primary thermal engine without anything having to be changed or re-adjusted on the primary thermal engine.

In another aspect, the secondary current generating assembly operates according to the inverted Brayton cycle (IBC). Compared with an ORC (organic Rankine cycle) installation for secondary conversion into electricity of waste heat, the secondary current generating assembly in accordance with the invention, in the form of the electric turbo compound (ETC) installation, which operates according to the inverted Brayton cycle (IBC), comprises fewer components and is therefore less expensive. Furthermore, the secondary current generating assembly can be constructed of commercially available components.

In still another aspect, the rotational speed of the secondary generator, and therefore of the exhaust gas turbine, can be adjusted by the process regulating system, and the rotational speed of the compressor can be adjusted via the electric motor and the process regulating system. Therefore, the secondary current generating assembly does not have to be specially designed and constructed for each specific primary current generating assembly, in particular each primary thermal engine, but can to the greatest extent be built up from commercially available standard components and adapted within broad ranges to the respective primary thermal engine via the rotational speed adjustment. Furthermore, the secondary current generating assembly can be optimally regulated to the secondary conversion of exhaust gas heat into electricity in terms of an optimal adaptation to the momentary operating states of the primary thermal engine and the exhaust gas post-treatment installation thereof.

The primary thermal engine is optionally formed as a piston engine or turbine. Cryogenic liquified natural gas (LNG) is advantageously used as fuel for the primary thermal engine. Other fuels such as e.g. liquified petroleum gas (LPG) or diesel are also possible. The piston engine in terms of this application can thus be a gas engine or a commercially available diesel engine. A gas engine in terms of this application is understood to be an internal combustion engine which is an internal combustion engine operating according to the Otto process, wherein gaseous fuel such as e.g. natural gas, liquid gas, wood gas, biogas, landfill gas, mine gas, furnace gas or hydrogen is used. The gas engine is also understood to be a gas turbine which comprises in particular a compressor, a combustion chamber and a turbine or an expander. A gas turbine of this type is based on the operating principle of the cyclic process. In at least one compressor stage, air is with a gas to form a combustion mixture and is ignited and burned in the combustion chamber. The hot gas produced by the combustion is allowed to expand in a turbine part so that thermal energy can be converted into mechanical energy. It is thus important that energy from a combustion process, to which gas is at least proportionately introduced, is converted into mechanical energy. The mechanical energy can then be supplied to a generator in order to generate primary electrical energy.

In a further aspect, a secondary inverter is also allocated to the secondary generator, a frequency converter is allocated to the electric motor of the compressor and the secondary inverter and the frequency converter are communicatively connected via a field bus to an electronic central controller. The controllable secondary inverter of the secondary generator and the controllable frequency converter of the electric motor of the compressor permit regulation of the voltage and feed current and consequently also the loading torque and rotational speed of the exhaust gas turbine and of the compressor to specific required set values.

Optionally, an electronic central controller permits control of the energy flows of the primary current generating assembly and of the secondary current generating assembly.

The vehicle in accordance with an aspect of the invention, with a previously described system with a secondary current generating assembly for secondary conversion into electricity of exhaust gas heat of a primary current generating assembly, is designed as a vehicle for handling freight containers and may be a harbour crane, a mobile harbour crane, a rubber tyre-borne gantry crane or a gantry lift stacker. At least one travel drive and at least one lifting drive are in this case supplied with energy by the primary current generating assembly and the secondary current generating assembly.

These and other objects, advantages and features of the invention will become apparent upon review of the following specification in conjunction with the drawings.

BRIEF DESCRIPTION OF THE DRAWINGS

An exemplified embodiment of the invention will be explained in greater detail hereinafter with reference to the drawings, in which.

DESCRIPTION OF THE PREFERRED EMBODIMENTS

Figure 1:
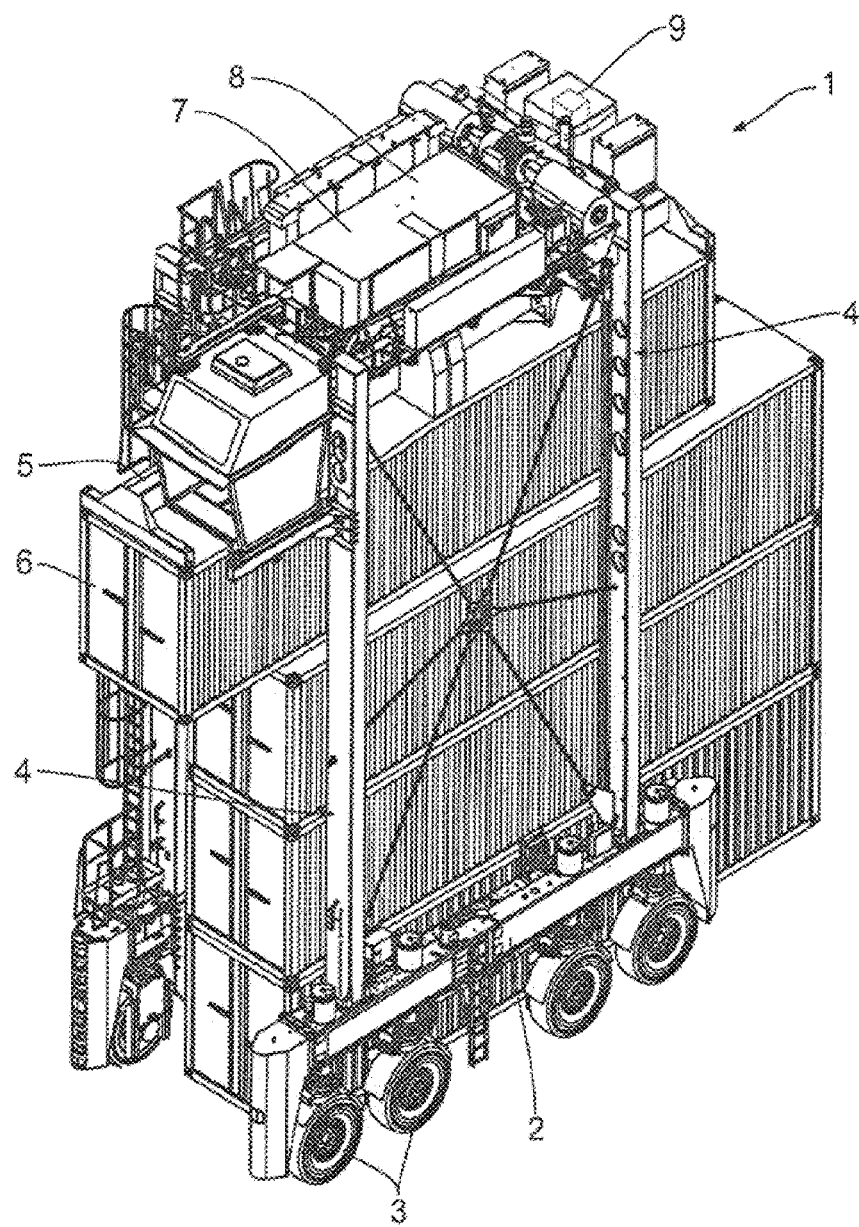
FIG. 1 is a perspective view of a gantry lift stacker in accordance with the present invention.

FIG. 1 shows a perspective view of a gantry lift stacker 1 in accordance with an exemplary embodiment of the invention, also referred to as a straddle carrier or van carrier. The gantry lift stacker 1 comprises two running gear unit supports 2 orientated in a travel direction of the gantry lift stacker 1, on which supports in each case four individual wheels 3 are disposed. The running gear unit supports 2 are disposed in parallel with each other and in a common horizontal plane. On an upper side facing away from the wheels 3 the two running gear unit supports 2 are connected to each other by two substantially U-shaped gantry frames 4. As seen in a forwards travel direction of the gantry lift stacker 1, the gantry frames 4 are disposed or erected on a front end of the running gear unit supports 2 and on a rear end of the running gear unit supports 2. The gantry lift stacker 1 comprises a spreader 5 which can be raised and lowered vertically and is guided within the two gantry frames 4 and on the two gantry frames 4. The spreader 5 serves as a load picking-up means for handling a freight container 6. The gantry lift stacker 1 and in particular the gantry frames 4 are arranged such that the gantry lift stacker 1 with a lifted container 6 can travel over up to three containers 6 which are stacked one above the other on the ground.

A primary current generating assembly 10 is provided to generate primary electrical energy required to operate the gantry lift stacker 1. According to the illustrated exemplified embodiment, the first current generating assembly 10 is disposed above an upper side defined by the two gantry frames 4. The primary current generating assembly 10 comprises a primary thermal engine 7 in the form of a turbine or an internal combustion engine, in particular diesel engine, and a primary generator 8 connected thereto for conversion of the energy generated by the thermal engine 7 into electrical energy. Furthermore, a secondary current generating assembly 9, illustrated in a purely schematic manner, in the form of an electric turbo compound installation (ETC installation) is provided. The secondary current generating assembly 9 is connected to the primary thermal engine 7 and serves to provide secondary conversion into electricity of exhaust gas heat, which arises from the primary current generating assembly 10, in particular from the thermal engine 7 and/or the generator 8, in order to generate the primary electrical energy in the form of alternating or three-phase current.

Figure 2:
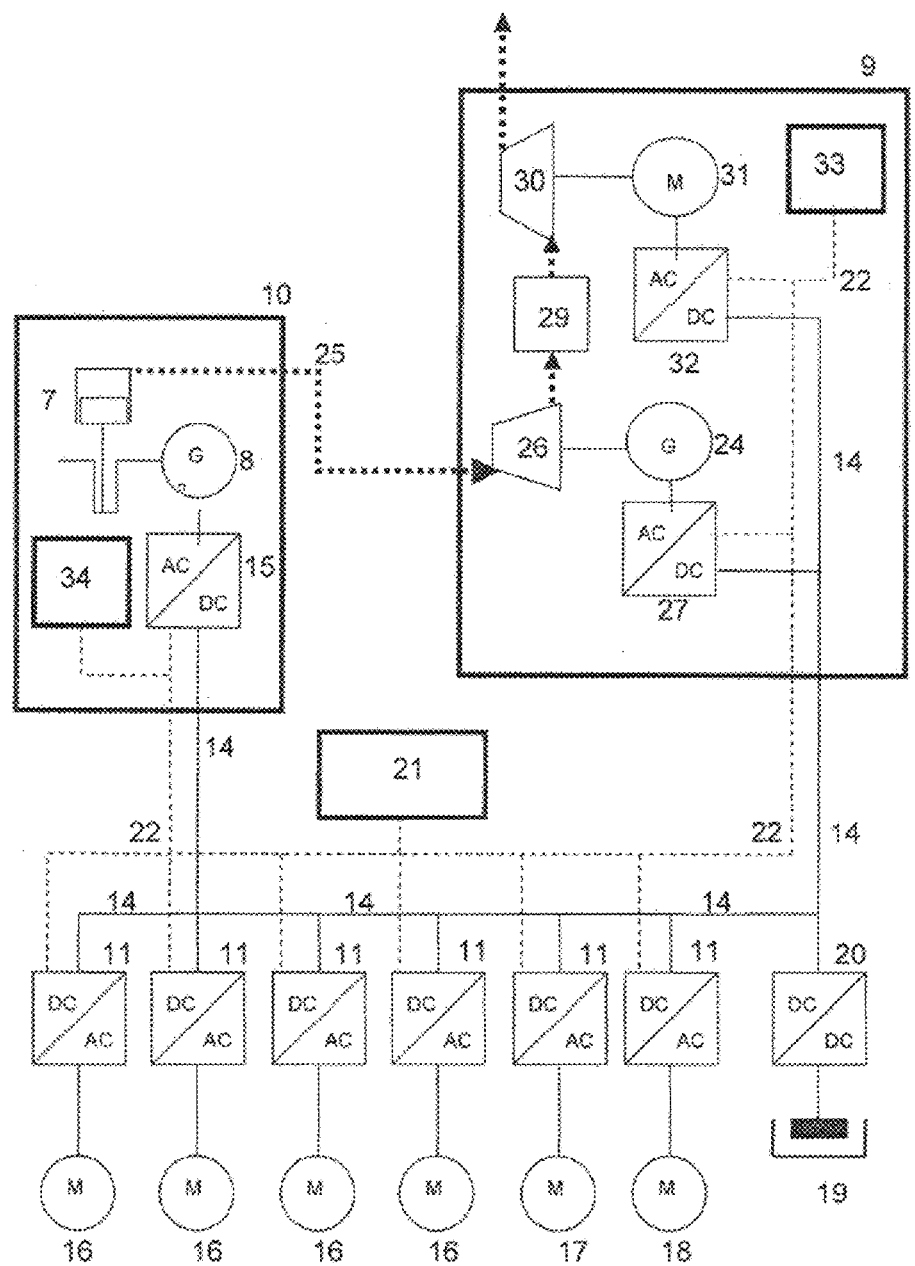
FIG. 2 is a schematic circuit diagram of an electric drive train of a gantry lift stacker according to FIG. 1.

FIG. 2 illustrates a schematic circuit diagram of an electric drive train of the gantry lift stacker 1, which comprises essentially a primary current generating assembly 10, a secondary current generating assembly 9 for secondary conversion into electricity of the waste heat of the primary current generating assembly 10, electric consumers in the form of running gear unit drives 16, lifting mechanism drives 17 and auxiliary drives 18 and optionally additional energy storage devices 19.

The primary current generating assembly designated as a whole by 10 comprises the primary thermal engine 7 and the primary generator 8 attached thereto. The primary generator 8 generates alternating/three-phase current which is made available as direct current for a direct voltage intermediate circuit 14 via a primary inverter 15 operated in rectifier mode. The direct voltage intermediate circuit 14 is shown by a continuous line. At the same time, the primary inverter 15 is connected, via a field bus 22 illustrated as a broken line and designed in particular as a CAN bus, to an electronic central controller 21, in particular a computer or programmable logic controller (PLC), of the gantry lift stacker 1. The electronic central controller 21 permits performance and energy storage device management of the gantry lift stacker 1. By means of the field bus 22 the electronic central controller 21 is connected to further inverters 11 which respectively supply the running gear unit drives 16, a lifting mechanism drive 17 and a further auxiliary drive 18 with electrical energy from the direct voltage intermediate circuit 14. In a corresponding manner via the direct voltage intermediate circuit 12, the further inverters 11 are connected to each other and to the primary inverter 15 of the primary current generating assembly 10 and to a secondary inverter 27 of the secondary current generating assembly 9.

A loading/unloading controller 20, in particular a step-up/step-down converter or DC/DC converter, is likewise connected via the direct voltage intermediate circuit 14 to the primary inverter 15 of the primary current generating assembly 10, the loading/unloading controller serving to control and monitor the energy storage device 19. The energy intermediate storage device 19 can be designed e.g. as a double-layer capacitor (supercaps, ultracaps), battery or flywheel energy store, in order to recover braking energy. Uniform use to capacity of the primary current generating assembly 10 can be ensured in spite of severe power fluctuations of the running gear unit drives 16 and of the lifting drive 17 e.g. in that these energy peaks are buffered and thereby damped in the energy storage device 19. It is thereby possible for the primary current generating assembly 10 to be able to feed substantially balanced and in particular uniform, continuous electric power into the direct voltage intermediate circuit 14 at a substantially constant rotational speed. The waste heat generated by the primary current generating assembly 10 is uniformly discharged to the secondary current generating assembly 9. In this way, fluctuations in the energy supply for the operation of the secondary current generating assembly 9 are reduced. Optimal operation for the secondary current generating assembly 9 is possible.

By the operation of the primary current generating assembly 10, in particular by the operation of the primary thermal engine 7, waste heat is produced which is symbolically illustrated by the dotted line in FIG. 2 as an exhaust gas stream of the thermal engine 25. The waste heat stream of the thermal engine 7 is supplied to the secondary current generating assembly 9 in the form of an exhaust gas stream for secondary conversion into electricity.

The secondary current generating assembly 9 is an ETC installation in which an exhaust gas turbine 26 is disposed behind an exhaust gas tract—illustrated as exhaust gas stream 25—of the primary thermal engine 7, and a secondary generator 24 running at high speed for generating current is coupled to the turbine shaft thereof on the output side in a gearless manner.

Generators 24 running at high speed in this manner can comprise e.g. a specially constructed rotor which is fitted with permanent magnets via which a sleeve of carbon fibre material is tensioned. It is thereby ensured that the sleeve securely holds together the rotor even in the case of very high centrifugal forces as a result of high rotational drive speeds. The high current frequencies of a generator 24 running at high speed in this manner cause large voltage drops at the reactances thereof. It is possible to provide electrical capacitors in the output lines of the generator in order to compensate for these voltage drops at least to a very large extent.

The exhaust gas turbine 26 can be disposed e.g. directly on an exhaust gas end pipe of the thermal engine 7, which, in the exemplified embodiment, is designed as a reciprocating piston engine, i.e. behind a possibly provided exhaust gas turbocharger, an exhaust gas post-treatment installation and a sound damper of the reciprocating piston engine in the exhaust gas stream 25. The secondary generator 24 generates alternating or three-phase current which is rectified by a regeneratively operated controllable secondary inverter 27 and fed into a direct voltage intermediate circuit 14 of the gantry lift stacker 1 for the electric main drives thereof, in particular travel drives 6, lifting drives 7 and any auxiliary drives 8 such as cooling pumps, fans, air-conditioning devices or heating devices. The controllable inverter 27 permits the voltage and feed current, and therefore also the loading moment and rotational speed of the exhaust gas turbine 26, to be regulated to specifically required set values which are pre-set by a process regulating system 33 of the ETC installation to the secondary inverter 27 of the secondary generator 24. For this purpose, the process regulating system 33 is connected via a field bus 22 to the secondary inverter 27 of the secondary generator 14. An exhaust gas cooler 29 is connected downstream behind the exhaust gas turbine 26. The cooling of the gases generates a negative pressure and therefore a pressure difference over the exhaust gas turbine 26 so that this can effect mechanical work on the secondary generator 24. Behind the exhaust gas cooler 29, a compressor 30 maintains the negative pressure of the cooled gases in that it compresses the gases to atmospheric pressure and discharges them into the environment. This process is designated in a known manner as an inverse gas turbine process or inverted Brayton cycle (IBC). By reason of the sub-atmospheric negative pressure of about 0.5 bar of the cooled gases behind the exhaust gas turbine 26, this turbine can be operated with an input pressure of about atmospheric ambient pressure, i.e. about 1 bar. Since the whole primary thermal engine 7 including its entire exhaust gas system is designed from the outset by the manufacturer for such an ambient pressure of about 1 bar as an outlet pressure behind its exhaust gas end pipe, there are no repercussions on the primary current generating assembly 10 and its exhaust gas treatment. The compressor 30 is driven by an electric motor 31 with adjustable rotational speed. This is fed from the direct voltage intermediate circuit 14 via a controllable frequency converter 22. The electric power consumption of the electric motor 31 of the compressor 30 is lower than the power output of the turbine generator 24 because, with the same pressure difference, the volume flow of the cooled gases to be delivered from the compressor 30 is lower than the volume flow of the hot gases through the turbine 26. The power excess of the secondary generator 24 with respect to the power consumption of the electric motor 31 of the compressor 30 results in a gain of electrical energy from the exhaust gas heat. The rotational speed set values for the exhaust gas turbine 26 and for the compressor 30 are pre-set by the electronic process regulator 33 which can be designed e.g. digitally as an industrial computer or programmable logic controller (PLC) with dedicated regulating software developed for this purpose. The process regulating system 33 of the ETC installation is communicatively connected via the field bus 22, which can be designed e.g. as a CAN bus, to the secondary inverter 27 and the frequency converter 32 of the exhaust gas turbine 26 and of the compressor 30 and also to an electronic control and regulating system 34 of the primary thermal engine 7, the momentary operating state variables of which, such as e.g. rotational speed, torque, power, operating state of the exhaust gas system, are transmitted to the field bus 22. The process regulating system 33 also obtains signals from pressure and temperature sensors which are mounted in the exhaust gas stream 25 before and behind the exhaust gas turbine 26.

As described above, during expansion of the exhaust gases in the exhaust gas turbine 26, both pressure and temperature of the exhaust gases fall. On the input side the gas molecules strike blades of the exhaust gas turbine 26 at high speed and thus output kinetic energy to the blades, which is then available on the turbine shaft as mechanical energy. In so doing, the gas molecules lose speed, which is associated with a reduction in temperature, and therefore there is a reduction in the thermal energy content of the exhaust gases. Therefore, the secondary conversion of exhaust gas energy into electricity carried out with the system in accordance with the invention can also be understood in terms of a secondary conversion of exhaust gas heat into electricity.

The process regulation of the IBC process of this ETC installation can take place with the process regulating system 33 as follows:

The rotational speed of the exhaust gas turbine 26 is adjusted by the process regulating system 33 so that the input pressure of the exhaust gas turbine 26 remains as constant as possible at about 1 bar. For this purpose, in addition to the measured pressure actual value from an input pressure sensor, the momentary operating state, determined e.g. with the aid of the rotational speed, torque and/or use to capacity of the primary thermal engine 7, is included in a suitable manner in the rotational speed set value for the exhaust gas turbine 26. The rotational speed of the compressor 30 is adjusted by the process regulating system 33 so that the sensor-measured output pressure of the exhaust gas turbine 26 is kept at a desired, sub-atmospheric, optimal set value. This optimal negative pressure set value is determined from the measured inlet temperature at the exhaust gas turbine 26. The higher the inlet temperature, the lower the negative pressure behind the exhaust gas turbine 26 should be. The rotational speed of the compressor 30 is additionally adapted to the momentary operating state of the primary thermal engine 7 and the momentary rotational speed of the exhaust gas turbine 26. The corresponding regulating characteristics can be measured e.g. experimentally during test runs and programmed into the regulating software of the process regulating system 33. All in all, the rotational speeds of the exhaust gas turbine 26 and compressor 30 are each regulated such that maximum electrical net output of the ETC installation is fed into the direct voltage intermediate circuit 14 and thus no counter-pressure reacts on the exhaust gas stream 25 of the exhaust gas system of the primary thermal engine 7.

It is particularly advantageous for the IBC process if the exhaust gases are cooled by the exhaust gas cooler 29 to the lowest possible temperatures, because then the gas volume stream to be delivered for the compressor 30, and therefore the energy consumption of the electric motor 31 of the compressor 30, is low and therefore the net output of the ETC installation is also high. If, e.g., the primary thermal engine 7 is operated with cryogenic liquified natural gas (LNG) as fuel, which must be vaporised by heating into the gaseous state, this can take place by means of the exhaust gas cooler 29 which can be constructed as a heat exchanger for the LNG vaporisation. Therefore, the exhaust gases are cooled to particularly low temperatures and the energy yield from the exhaust gases is particularly high.

The integration of the secondary current generating assembly 9 in terms of control and regulation technology into a drive system of the gantry lift stacker 1—particularly a system which is already provided—is effected in that the secondary inverter 27 and/or the process regulating system 33 of the secondary current generating assembly 9 communicates with further components of the drive system, in particular with the electronic central controller 21, via the field bus 22. The communicative connection by means of a field bus 22 designed as a CAN bus can advantageously take place according to international standard SAE J1939 and according to the DRIVE COM standard. By means of the field bus 22 the current strength fed from the secondary generator 24, in particular the introduced electric power, and in particular further actual values detected e.g. by sensors, not illustrated, in the secondary inverter 28, and state signals such as 'ready for operation' or 'fault in the gantry lift stacker 1' are transmitted to the electronic central controller 21.

Software implemented in the electronic central controller 21 automatically evaluates these signals and actual values of the secondary current generating assembly 9 and therefore influences set values and control signals for the running gear unit drives 16, the lifting mechanism drive 17 and the auxiliary drives 18 and in particular for the primary current generating assembly 10. The implemented software can be power management software for energy flow control in the electronic central controller 21. The power management software arithmetically balances the electric feed power momentarily available from the two current generating assemblies 9, 10 with the power required by the consumers, i.e. the running gear unit drives 16, the lifting mechanism drive 17 and the auxiliary drives 18 in the momentary operating state. At the same time, the power management software limits—in particular also via the field bus 22—the set values for the drives 16, 17 and 18 such that the current generating assemblies 9, 10 are not overloaded and the direct voltage in the direct voltage intermediate circuit 14 does not fail. It can thus be advantageous if the set torque is limited in the travel drives 16 and the set rotational speed is limited in the lifting drive 17. Furthermore, the power management software can also control set values for the loading and/or unloading of the energy storage device 19 strategically such that braking and lowering energy is intermediately stored and recovered. Furthermore, power peaks can be buffered so that the two current generating assemblies 9, 10 are loaded uniformly and in particular without severe fluctuations in power.

Although embodiments of the invention have been described in conjunction with a gantry lift stacker 1, it can also be applied to any other current generating assemblies, such as e.g. block heat and power plants or in other vehicles or ships.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A vehicle for handling freight containers having a system having a primary current generating assembly, comprising a primary thermal engine, and having a secondary current generating assembly, in the form of an electric turbo compound installation, for secondary conversion into electricity of exhaust gas heat of the primary current generating assembly, wherein the secondary current generating assembly comprises an exhaust gas turbine, disposed in an exhaust gas stream of the primary thermal engine, and the exhaust gas turbine drives a secondary electric generator, wherein, in the exhaust gas stream, an exhaust gas cooler followed by a compressor is disposed behind the exhaust gas turbine, the compressor is driven by an electric motor and the rotational speeds for the compressor and exhaust gas turbine are controlled by a process regulating system, wherein a secondary inverter is allocated to the secondary generator, a frequency converter is allocated to the electric motor of the compressor, and the secondary inverter and the frequency converter are communicatively connected via a field bus to an electronic central controller, wherein the electronic central controller permits control of the energy flows of the primary current generating assembly and of the secondary current generating assembly, and the primary current generating assembly and the secondary current generating assembly supply at least one travel drive and at least one lifting drive with energy, wherein the rotational speeds for the compressor and exhaust gas turbine are controlled by the process regulating system in such a way that ambient pressure prevails in the exhaust gas stream at the input of the exhaust gas turbine.

2. The vehicle as claimed in claim 1, wherein the rotational speeds for the compressor and exhaust gas turbine are controlled by the process regulating system in such a way that negative pressure prevails in the exhaust gas stream at the output of the exhaust gas turbine.

3. The vehicle as claimed in claim 1, wherein the secondary current generating assembly operates according to the inverted Brayton cycle (IBC).

4. The vehicle as claimed in claim 1, wherein the rotational speed of the secondary generator can be adjusted by the process regulating system.

5. The vehicle as claimed in claim 1, wherein the rotational speed of the compressor can be adjusted by the electric motor and the process regulating system.

6. The vehicle as claimed in claim 1, wherein the primary thermal engine is designed as a piston engine or turbine.

7. The vehicle as claimed in claim 6, wherein the primary thermal engine uses cryogenic liquefied natural gas (LNG) as fuel.

8. The vehicle as claimed in claim 1, wherein the vehicle is a harbor crane, a mobile harbor crane, a rubber tire-borne gantry crane or a gantry lift stacker.

9. The vehicle as claimed in claim 1, wherein the rotational speeds for the compressor and exhaust gas turbine are controlled by the process regulating system in such a way that negative pressure prevails in the exhaust gas stream at the output of the exhaust gas turbine.

10. The vehicle as claimed in claim 9, wherein the secondary current generating assembly operates according to the inverted Brayton cycle (IBC).

11. The vehicle as claimed in claim 10, wherein the rotational speed of the secondary generator can be adjusted by the process regulating system.

12. The vehicle as claimed in claim 11, wherein the rotational speed of the compressor can be adjusted by the electric motor and the process regulating system.

13. The vehicle as claimed in claim 12, wherein the primary thermal engine is designed as a piston engine or turbine.

14. The vehicle as claimed in claim 13, wherein the primary thermal engine uses cryogenic liquefied natural gas (LNG) as fuel.

15. The vehicle as claimed in claim 14, wherein the vehicle is a harbor crane, a mobile harbor crane, a rubber tire-borne gantry crane or a gantry lift stacker.

\* \* \* \* \*